(12) United States Patent
Dzeba et al.

(10) Patent No.: US 12,405,010 B2
(45) Date of Patent: Sep. 2, 2025

(54) HEATING DEVICE WITH IMPROVED EFFICIENCY

(71) Applicant: Suter Entfeuchtungstechnik AG, Lupfig (CH)

(72) Inventors: Gordan Dzeba, Dintikon (CH); Mike Flueckiger, Muenchwilen (CH)

(73) Assignee: Suter Entfeuchtungstechnik AG, Lupfig (CH)

( * ) Notice: Subject to any disclaimer, the term of this patent is extended or adjusted under 35 U.S.C. 154(b) by 465 days.

(21) Appl. No.: 17/979,205

(22) Filed: Nov. 2, 2022

(65) Prior Publication Data

US 2023/0139453 A1    May 4, 2023

(30) Foreign Application Priority Data

Nov. 3, 2021    (EP) ..................................... 21206283

(51) Int. Cl.
*F24B 5/02*    (2006.01)
*F23B 80/04*    (2006.01)
(Continued)

(52) U.S. Cl.
CPC .............. *F24B 5/023* (2013.01); *F24B 1/026* (2013.01); *F24B 5/025* (2013.01); *F24B 13/006* (2013.01);
(Continued)

(58) Field of Classification Search
CPC .......... F24B 5/023; F24B 1/026; F24B 5/025; F24B 13/006; F24B 13/04; F24B 1/185;
(Continued)

(56) References Cited

U.S. PATENT DOCUMENTS

| 4,517,903 A | 5/1985 | Richmond et al. |
| 2004/0060553 A1* | 4/2004 | Laitinen ................... F24B 5/026 |
| | | 126/61 |

FOREIGN PATENT DOCUMENTS

| DE | 202010016404 U1 * | 3/2011 | .............. F23B 60/00 |
| DE | 20 2015 101 213 U1 | 4/2015 | |

(Continued)

OTHER PUBLICATIONS

Machine Translation of DE 202010016404 (Year: 2011).*
(Continued)

*Primary Examiner* — Steven B McAllister
*Assistant Examiner* — Amy E Carter
(74) *Attorney, Agent, or Firm* — Collard & Roe, P.C.

(57) ABSTRACT

A heating device, preferably for the combustion of biomass, in particular of pellets of biomass, in one aspect, includes a burner part and a heating part. The burner part includes a combustion chamber; a double-walled, internally hollow combustion-chamber wall, which has an upper opening leading above the combustion zone into the combustion chamber; a flue-gas duct which leads the flue gas downwards along the combustion chamber, wherein the flue-gas duct is followed by a heat-exchanger area including initially, a flat-tube flue-gas heat exchanger, then, a tertiary-air heat exchanger; a flue-gas ventilation stack, a radiant-heat exchanger located above the combustion chamber, a flue-gas flap at the upper end of the flue-gas duct, which, when open, connects the flue-gas duct to the stack. A flat-tube flue-gas heat exchanger of the heating part forms a heat-exchanger circuit with an exhaust-air heat exchanger with the same heat-transfer medium as the flat-tube flue-gas heat exchanger.

18 Claims, 2 Drawing Sheets

(51) Int. Cl.
  *F24B 1/02* (2006.01)
  *F24B 13/00* (2006.01)
  *F24B 13/04* (2006.01)
  *F24H 9/00* (2022.01)
  *F24H 9/189* (2022.01)

(52) U.S. Cl.
  CPC ............ *F24B 13/04* (2013.01); *F24H 9/0084* (2013.01); *F24H 9/189* (2013.01); *F23B 80/04* (2013.01); *F24D 2200/067* (2013.01)

(58) Field of Classification Search
  CPC .......... F24B 7/045; F24B 80/04; F24B 1/024; F24B 7/025; F24B 40/00; F24B 50/06; F24B 80/00; F24B 1/1883; F24B 1/188; F23G 2209/26; F23G 7/10; F23J 2700/003; F23J 1/06; F23B 50/12; F23B 7/025; F23L 1/02; F23L 17/005; F23L 15/04; F23L 2900/15043; F24D 5/00; F24D 2200/18; F24D 2200/067; F24H 9/189; F24H 1/0036; F24H 1/0063; F24H 1/06; F24H 3/027; F24H 3/067; F24H 9/0073; F24H 9/2092; F24H 2230/00; F24H 9/0089; F24H 9/0084; Y02E 20/34
  USPC .................................... 126/67, 70, 523–535
  See application file for complete search history.

(56) References Cited

FOREIGN PATENT DOCUMENTS

| DE | 202018001770 U1 * | 6/2018 | |
|---|---|---|---|
| EP | 3 438 528 A1 | 2/2019 | |
| WO | WO-2015052364 A1 * | 4/2015 | ............. F23B 80/04 |
| WO | WO-2017168772 A1 * | 10/2017 | ............. F23B 10/02 |

OTHER PUBLICATIONS

Machine Translation of DE-202018001770 (Year: 2018).*
Machine Translation of WO 2015052364 (Year: 2015).*
Machine Translation of WO 2017168772 (Year: 2017).*
European Search Report in European Application No. 21206283.0 dated Apr. 5, 2022 with English Translation of relevant parts.

* cited by examiner

HEATING DEVICE WITH IMPROVED EFFICIENCY

CROSS REFERENCE TO RELATED APPLICATIONS

Applicant claims priority under 35 U.S.C. § 119 of European Application No. 21206283.0 filed Nov. 3, 2021, the disclosure of which is incorporated by reference.

BACKGROUND OF THE INVENTION

1. Field of the Invention

All documents cited in the present application are incorporated into the present disclosure by reference in their entirety.

The present invention relates to a heating device, preferably for the combustion of biomass products with increased efficiency, in particular, pellets made of biomass, a method for increasing the efficiency of (corresponding) heating devices and corresponding uses.

2. Description of the Related Art

From the prior art, a wide variety of heating devices are known. It is also known to operate heating devices using pellets. For example, the heating devices from the prior art also comprise, in addition to the combustion chamber in which the combustible material is burned, heat exchangers adjacent to the combustion chamber or the hot exhaust pipe, which heat exchangers are in turn used to release heat to the air to be heated, wherein water or air are used as a heat-transfer medium.

For example, the following can be listed as prior art:
DE 20 2010 016 404 U1 or DE 20 2018 001 770 U1.

Due to design, quite a lot of unused heat is released into the environment via the exhaust gases in the cases of devices of the prior art. The efficiency of these devices is not optimal.

In this respect, there is still considerable potential for improvement starting from the previous prior art.

SUMMARY OF THE INVENTION

Accordingly, the object of the present invention is to provide heating devices which show improved levels of efficiency compared to the devices of the prior art.

At the same time, it is an object of the present invention to provide a method with the help of which an increase in efficiency of heating devices can be achieved.

Ultimately, possible uses for efficiency-enhanced heating devices should be found.

Further objects can be seen from the following description.

These and other objects are solved in the context of the present invention by the subject-matter of the independent claims.

Preferred embodiments can be seen from the dependent claims as well as the following description.

In the context of the present invention, temperature specifications, unless otherwise stated, are in degrees Celsius (° C.).

Unless otherwise specified, combustion is executed at ambient pressure (=normal pressure/atmospheric pressure), i.e., at 1,013 mbar.

In the context of the present invention, the term "comprise" also includes "consisting of"; that is, a corresponding list can contain other elements in addition to the explicitly mentioned elements (=comprise), or it can contain exactly these elements (=consist of) (wherein insignificant elements such as screws, markings, etc. are not taken into account).

In the case of relative information such as up, down, left, right or similar, in the context of the present invention as a reference system, an observer standing upright on the ground in front of the discussed object is assumed.

In particular, subject matter of present invention is a heating device comprising:
A) a burner part, comprising
   a combustion chamber,
   a double-walled, internally hollow combustion-chamber wall which has an upper opening leading above the combustion zone into the combustion chamber,
   a flue-gas duct which leads the flue gas downwards along the combustion chamber,
   following the flue-gas duct a heat-exchanger area comprising
      initially, a flat-tube flue-gas heat exchanger,
      then, a tertiary-air heat exchanger,
   a flue-gas ventilation stack,
   a radiant-heat exchanger located above the combustion chamber,
   a flue-gas flap at the upper end of the flue-gas duct which, when open, connects the flue-gas duct to the stack,
B) a heating part, comprising
   an air suction blower,
   an exhaust-air heat exchanger with the same heat-transfer medium as the flat-tube flue-gas heat exchanger,
   an outlet opening for the heated air,
   wherein the flat-tube flue-gas heat exchanger forms a heat-exchanger circuit with the exhaust-air heat exchanger.

In preferred embodiments of the present invention, the combustion chamber comprises inlet ducts or inlet openings for primary air and secondary air, a firing grate and a burner, a feed opening for combustible material and a combustible material-waste collection chamber and/or a combustible material-waste discharge device, preferably a duct, in particular, via a screw conveyor for removing the combustible material waste connected to the combustion chamber. Furthermore, variants can provide for an inspection window with which the combustion in the combustion chamber can be visually checked.

However, it is also possible and preferred in variants of the invention to monitor the combustion by means of electronic monitoring, for example, thermal sensors and cameras (automatically).

In some preferred variants of the present invention, the primary air intake into the combustion chamber is the end of an air suction channel, which is led along the combustion-chamber wall. This causes that during operation the primary air enters the system already preheated (by heat radiated via the combustion-chamber wall); in addition, heat radiated through the combustion-chamber wall is used sensibly and not released unused. At the same time, the secondary air can also be preheated through a corresponding duct.

The ignition of the combustion can be carried out in any conventional manner. For example, a gas flame can be used for ignition. This can be part of the device in the form of a small gas burner. Or a ceramic ignition element, as part of the device, can be used for ignition by means of airflow.

In preferred embodiments of the present invention, the heating device comprises a (pellet) storage container which is connected to the combustion chamber via the feed opening for combustible material, preferably via a screw conveyor.

In preferred embodiments of the present invention, the upper opening of the double-walled, internally hollow combustion-chamber wall leads above the combustion zone and afterburn zone into the combustion chamber. In addition, the double-walled, internally hollow combustion-chamber wall in preferred variants of the present invention can comprise a lower opening or a connection configured to get tertiary air introduced. By this it is achieved that the air already preheated by the tertiary-air heat exchanger is further heated through the wall (of the combustion chamber) in the double-walled, internally hollow combustion-chamber wall and is introduced into the combustion chamber in a quasi double-preheated state above the combustion zone and mixed with the flue gas. This results in several favourable effects: on the one hand, the flue gas is diluted so that the exhaust gases that later emerge from the flue have a lower pollutant concentration. On the other hand, it is achieved that energy is "captured" by means of tertiary air, which would otherwise escape from the system unused, on the one hand, directly after the heat-exchanger area and, on the other hand, through the combustion-chamber wall.

In preferred embodiments of the present invention, the flue-gas duct is arranged in relation to the double-walled, internally hollow combustion-chamber wall on the other side of the combustion chamber, and the flue gas is led down along the wall of the flue-gas duct located on the combustion chamber. Thus, a kind of counter-current principle is applied, whereby the flue gases are further heated by the heated wall (of the combustion chamber). Together with the use of tertiary air, this also brings about that the heat energy radiating through the combustion-chamber wall is used and does not leave the system unused.

In further preferred embodiments of the present invention, the combustion-chamber side walls, apart from the inlets for primary and secondary air and combustible material supply and, where applicable, the combustible material discharge, can be completely enclosed by flue-gas duct and double-walled, internally hollow combustion-chamber wall, for example, about half, or at a ratio of 1:2, or 1:3, or 1:4 or any other ratios of flue-gas duct to double-walled, internally hollow combustion-chamber wall, in each case based on the proportion of the circumference of the respective covered combustion-chamber wall. This can optimize the "capturing" of energy radiated through the combustion-chamber side walls. Of course, it is also possible in this case to provide further openings for viewing and/or inspection windows for example.

In preferred embodiments of the present invention, the heat-exchanger area is arranged in the flow direction of the flue gas beyond the flue-gas duct. The flat-tube flue-gas heat exchanger is operated with thermal oil as a heat-transfer medium. The thermal oil is preferably selected from mineral oils, synthetic oils or silicone oils, particularly preferably silicone oil is used in the context of the present invention. The tertiary-air heat exchanger comprises inlet ducts or inlet openings for tertiary air and discharges connected to the double-walled, internally hollow combustion-chamber wall for the heated tertiary air. The tertiary-air heat exchanger attracts air from the outside, which is then heated by the flue gas. The air heated in this way is then led to the double-walled, internally hollow combustion-chamber wall, through it under further heating and ultimately above the combustion zone into the combustion chamber.

The double-walled combustion-chamber wall is preferably designed with internal baffles, each blocking a part of the flow path and thus redirecting the airflow so that an air flow results, which flows through the interior of the double-walled combustion-chamber wall in a meander-like or entwining manner. This causes the tertiary-air flow to flow almost completely along the (hot) combustion-chamber wall and thus an as effective as possible heat transfer to the tertiary air takes place.

In preferred embodiments of the present invention, an area with induced-draft blower adjoins the heat-exchanger area; in variants, however, an induced-draft blower can also be arranged in or at the flue-gas ventilation stack, where applicable, also additionally. These blowers have the purpose of generating an underpressure in the burner part, so that on the one hand air (primary, secondary and tertiary air) is sucked through the device, and on the other hand no flue gases escape due to possible leaks.

In preferred embodiments of the present invention, the heating part comprises an air suction part, preferably in the form of at least one air duct, which sucks in air from above the radiant-heat exchanger or through the radiant-heat exchanger.

In preferred embodiments of the present invention, the air suction blower of the heating part is configured or converted so that it at least partially, preferably partially, sucks in air from the air suction part, particularly preferably 40 to 60% thereof, in particular 50%, and otherwise sucks in air from the environment, wherein the percentages refer to the total volume amount of air sucked in.

In preferred embodiments of the present invention, the two parts A) and B) (burner part and heating part) are connected by the piping of the flat-tube flue-gas heat exchanger with the exhaust-air heat exchanger, and, where applicable, by the connection of the air intake of the heating part to the radiant-heat exchanger, and are otherwise physically separated units. However, it is also possible in the context of the present invention, and accordingly preferred in variants, to firmly join the two parts together (by screwing, welding, riveting, etc.).

A particularly preferred heating device according to the present invention, preferably for the combustion of biomass, in particular of pellets from biomass, comprises or consists accordingly of:

A) a burner part, comprising
    a combustion chamber comprising
        inlet ducts or inlet openings for primary air and secondary air,
        a firing grate and a burner
        a feed opening for combustible material,
        a combustible material-waste collection chamber and/or a combustible material-waste discharge device, preferably a duct, in particular, via a screw conveyor for the removal of the combustible material waste connected to the combustion chamber,
    a (pellet) storage container, which is connected to the combustion chamber via the feed opening for combustible material, preferably via a screw conveyor, a double-walled, internally hollow combustion-chamber wall which has an upper opening which leads above the combustion zone, preferably above the combustion zone and afterburn zone, into the combustion chamber and comprises a lower opening or connection configured to get tertiary air introduced, a flue-gas duct arranged on the other side of the combustion chamber in relation to the double-walled, internally hollow combustion-chamber wall, and which leads the flue gas downwards from above along its wall adjacent to the combustion chamber, adjacent to the flue-gas duct, arranged from the direction of view of the combustion chamber beyond the flue-gas duct, a heat-exchanger area comprising, initially, a flat-tube flue-gas heat exchanger, preferably with thermal oil as a heat-transfer medium, then, a tertiary-air heat exchanger comprising inlet ducts or inlet openings for tertiary air and discharges for the heated tertiary air connected to the double-walled, internally hollow combustion-chamber wall, optionally, adjoining the heat-exchanger area, an area with an induced-draft blower, a flue-gas ventilation stack.

a radiant-heat exchanger located above the combustion chamber, a flue-gas flap at the upper end of the flue-gas duct which, when open, connects the flue-gas duct to the stack, B) a heating part, comprising an air suction part that sucks in air from above the radiant-heat exchanger or through the radiant-heat exchanger, an air suction blower which at least partially, preferably partially, sucks air from the air suction part, particularly preferably 40 to 60%, in particular 50%, and otherwise sucks in air from the environment, wherein the percentages refer to the total amount of air sucked in, an exhaust-air heat exchanger with the same heat-transfer medium as the flat-tube flue-gas heat exchanger, preferably thermal oil, an outlet opening for the heated air, wherein the flat-tube flue-gas heat exchanger forms a heat-exchanger circuit with the exhaust-air heat exchanger, and the two parts A) and B) are connected by the piping of the flat-tube flue-gas heat exchanger to the exhaust-air heat exchanger, and, where applicable, by the connection of the air intake of the heating part to the radiant-heat exchanger, and are otherwise physically separate units.

The fact that the heating part and burner part are separate units allows flexible handling. Thus, if a part is defective, this part can be replaced quickly without the entire heating device having to be replaced. Furthermore, it is possible to replace individual parts in order to adapt this to the circumstances, for example to set up larger or smaller units. Nevertheless, the heating part and the burner part will usually be used/transported/set up together as a heating device, especially if it is designed as a mobile variant (for which a frame or support frame, which can be a car trailer frame, may be intended).

In the context of the present invention, the outlet opening for heated air can be provided in appropriate further embodiments with a hose in order to be able to better direct/guide the escaping heated air to the intended destination.

Furthermore, subject matter of the present invention is a method for increasing the efficiency of a heating device by firing a combustion in a combustion chamber, as described in the context of this invention, under supply of primary air through the combustion zone and supply of secondary air at the upper end of the combustion zone, conducting the flue gas first via a flat-tube flue-gas heat exchanger and then via a tertiary-air heat exchanger.

conducting the tertiary air thus heated into a double-walled, internally hollow combustion-chamber wall for further heating, leading the heated tertiary air from the double-walled, internally hollow combustion-chamber wall above the combustion zone, preferably above the combustion zone and afterburn zone, into the combustion chamber and mixing with the flue gas, transferring heat to at least part of the air to be heated by a heat exchanger located above the combustion chamber, transferring further heat to the air to be heated by an exhaust-air heat exchanger by means of heat-transfer medium, preferably thermal oil, in particular, silicone oil, heated in the flat-tube flue-gas heat exchanger and/or lamellar heat exchanger.

Another subject matter of the present invention is a burner part for heating devices, as otherwise described in this application. The piping of the heat exchanger intended for heat transfer to a heating part is only optional in this; it can be pre-installed, but it doesn't have to be. The air and gas flow in connection with the installed heat exchangers of the burner part is essential for this subject matter of the present invention.

Accordingly, a burner part, preferably for a heating device, is preferred, comprising a combustion chamber comprising inlet ducts or inlet openings for primary air and secondary air, a firing grate and a burner, a feed opening for combustible material, a combustible material-waste collection chamber and/or a combustible material-waste discharge device, a (pellet) storage container, which is connected to the combustion chamber via the feed opening for combustible material, preferably via a screw conveyor, a double-walled, internally hollow combustion-chamber wall, which has an upper opening which leads above the combustion zone, preferably above the combustion zone and afterburn zone, into the combustion chamber and a lower opening, configured to get tertiary air introduced, a flue-gas duct arranged on the other side of the combustion chamber in relation to the double-walled, internally hollow combustion-chamber wall, and which leads the flue gas downwards from above along its wall adjacent to the combustion chamber, adjacent to the flue-gas duct, arranged in the flow direction of the flue gas beyond the flue-gas duct, a heat-exchanger area comprising initially a flat-tube flue-gas heat exchanger, preferably with thermal oil as a heat-transfer medium, then, a tertiary-air heat exchanger comprising inlet ducts or inlet openings for tertiary air and discharges for the heated tertiary air, which are connected to the double-walled, internally hollow combustion-chamber wall, optionally, adjoining the heat-exchanger area, an area with an induced-draft blower, a flue-gas ventilation stack, a radiant-heat exchanger located above the combustion chamber, a flue-gas flap at the top of the flue-gas duct which, when open, connects the flue-gas duct to the flue.

Another subject matter of the present invention is the use of the heating device according to the invention for heating of areas to be heated, in particular (partially) separated areas, in particular, rooms. In the context of the present invention, the rooms also include tents, fair stalls or the like in addition to chambers.

In addition, subject matter of the present invention is also the use of the method according to the invention for increasing the efficiency of heating devices.

In addition, subject matter of the present invention is also the use of the burner part according to the invention for the combustion of combustible materials, preferably of biomass, in particular wood pellets, or for heating areas to be heated, optionally together with a heating part, in particular a heating part as otherwise described in this application.

Further preferred embodiments can be found below.

The heating device of the present invention can be designed both as a stationary unit as well as a mobile unit. In some preferred variants, it is designed as a mobile unit. In this case, rollers or wheels may be mounted under the heating device. In other variants, the heating device can be mounted or arranged on a commercially available car trailer. In other variants, it can be designed as a device on wheels with a trailer hitch, i.e., constitute a trailer by itself.

The heating device of the present invention is not fixed to a certain size. For the most flexible and economical use possible, however, sizes that correspond to or fit on commercially available car trailers are favourable. In this respect, the devices of the present invention in preferred embodiments are about 1 to 3 m long, 1.5 to 2.5 m wide and 1.5 to 2.5 m high.

If the heating devices according to the invention (or the burner part according to the invention) have wheels or rollers or are loadable on a car trailer, the device can be referred to as a mobile heating device.

In variants, it is preferred if the heating device according to the invention (or the burner part according to the invention) is electronically regulated and/or controlled. For this purpose, corresponding sensors and at least one control unit are arranged on the device. Accordingly, the control unit comprises an operating unit with which it can be operated by a user.

If desired, it is also possible to arrange a control unit on the device, which can be operated remotely and thus can be controlled remotely (for example, if it becomes too warm in the heated area, the power of the device can be reduced). Such remote control can be carried out via W-LAN, Bluetooth (or other radio communication) or the like, for example, also by means of a (smartphone-) app.

The controls according to the invention are preferably operated in such a way that when heating up or starting up the combustion process and during ongoing operation, optimal air supply and flue gas removal is ensured, in particular, by regulating the strength of the induced-draft blower in the burner part and, where applicable, opening and closing throttle valves in the primary, secondary and tertiary air ducts or inlets. In addition, the air suction blower of the heating part is regulated in variants in such a way that an optimal airflow/heat absorption ratio is achieved. It is preferable not to supply tertiary air when heating up or starting up. For example, this would first cool the flue gas flow and accordingly the stack-effect would be reduced (so that more power would be required for the blower).

In the course of the combustion process (i.e., after heating up/starting up), the suction effect of the air rising in the double-walled, internally hollow combustion-chamber wall (due to the fact that it is heated) is sufficient to bring the required amount of tertiary air into the system. However, it is also possible in the context of the invention to auxiliarily arrange a blower in the tertiary-air system. Similarly, the openings/inlets for air supply are usually sufficient for primary or secondary air; however, a blower can also in this case be arranged in each case to support the respective air flow (for example, to "fan" the combustion).

Furthermore, the position of the flue-gas flap is preferably regulated depending on the temperature in the burner part. Although it is possible to implement this via mechanical devices, such as fuses or the like, this is less preferred in the sense that such fuses must be replaced after use. In this respect, the flue-gas flap is preferably electronically regulated.

Due to its structure, the flat-tube gas heat exchanger causes the gas to flow through it relatively slowly (or flow around the flat-tube lamellae), thereby having a lot of time to effectively transfer heat to the heat-transfer medium, particularly thermal oil.

The control of the combustible material supply is carried out in preferred variants of the present invention via the rotational speed of the screw conveyor from the (pellet) storage container to the combustion chamber. This makes it possible to effectively adjust that on the one hand not too much combustible material is supplied, which could make it too hot, and, on the other hand, also that not too little combustible material is supplied, so that the combustion does not stop, or too little heat is generated.

Accordingly, a preferred variant of the present invention lies therein to regulate the whole device electronically, namely particularly preferably air supply, combustible material supply, combustible material residual quantity monitoring data, temperature (in the combustion chamber), blower powers, pump powers for the flat-tube flue-gas heat exchanger/exhaust-air heat exchanger heat-exchanger circuit, flue-gas flap, to detect and accordingly electrically (re-) regulating possible emergency shutdown conditions via sensors.

In the context of the present invention, it was surprisingly found that a very high efficiency can be achieved by the heating device according to the invention, the burner part according to the invention or the method according to the invention.

This is achieved according to the invention in that by the entirety of the constructive measures a very high utilization of the heat generated by the combustion is achieved, which goes well beyond what has been achieved thus far in the prior art. In the context of the present invention, the heat is transferred to the heating part directly via two heat exchangers (flat-tube flue-gas heat exchanger and radiant-heat exchanger). In addition, a highly effective energy management system is operated within the burner part, to the effect that the heat generated in the combustion chamber is not simply transferred through the flue gases, but the flue gases are additionally heated by passing along the flue-gas duct on the combustion-chamber wall and by mixing already heated tertiary air with the flue gas. In addition, the "envelopment" of the combustion chamber with flue-gas duct, double-walled, internally hollow combustion-chamber wall, and, where applicable, primary and secondary-air supply ducts, achieves an effective use of the heat radiated through the combustion chamber walls, which is thus not released unused into the environment, or makes an additional complicated and expensive insulation of the combustion chamber superfluous.

Overall, in the present invention, therefore, the energy released by the combustion is captured or converted as effectively as possible at as many places as possible.

The functioning of the heating device according to the invention can also be briefly described as follows:

In the combustion chamber, combustible materials, preferably based on biomass, in particular (wood) pellets, which are pushed into the combustion chamber by means of a conveying device, in particular, a screw conveyor, are ignited. The combustion receives air from the primary as well as the secondary-air duct. This generates the flue gases. An underpressure is generated by the induced-draft blower. Thus, the flue gases are mixed with the tertiary air (this is sucked by the underpressure from the outside through the tertiary-air heat exchanger, the connection to the double-walled, internally hollow combustion-chamber wall and then through it). This mentioned tertiary air is heated by this across two stages. The first stage is the tertiary-air heat exchanger, in which the residual flue gas temperature is used. With the second stage, the already preheated air is led via a duct, which has a continuously variable throttle valve, into the double-walled, internally hollow combustion-chamber wall and thus further heated via the radiant heat. The flue gases mixed with the tertiary air are drawn through the side duct to the flat-tube flue-gas heat exchanger and tertiary air heat exchanger. These are then ejected into the atmosphere through the stack.

With the flue gases that flow through the flat-tube flue-gas heat exchanger, the thermal oil is heated. This in turn is then conveyed with a pump through the exhaust-air heat exchanger in the heating part. The usable exhaust-air heat in the heating part is generated by two stages. On the one hand, a part of the intake air for the exhaust-air module is preheated by the radiant-heat exchanger. And, on the other hand, the exhaust air is heated via the exhaust-air heat exchanger.

The (pellet) storage container is preferably connected to the combustion chamber in the context of the present invention in such a way that (adjustable) combustible materialkiln run or combustible material (these two terms are used synonymously in the present invention) is fed into the combustion chamber. Preferably, this is done via a screw conveyor, which has various advantages, inter alia, good controllability (of the amount) and low risk of a return fire. The (pellet) storage container is usually a large vessel into which the combustible material is filled and reaches the lower end of the container by gravity; in this respect, the container is preferably at least partially bevelled downwards. At this lower end, a screw conveyor is then arranged in preferred embodiments, which conveys the combustible material (regulated) into the combustion chamber.

In addition, a level monitoring device may be arranged in or on the (pellet) storage container. In principle, this can be any device suitable for that, but preferably an ultrasound or radar probe, in particular radar probe, is used.

The heat exchangers used in the heating device of the present invention are conventional heat exchangers in which a heat-transfer medium flowing through pipes is heated or cooled by a fluid flowing around these pipes, whereby the fluid transfers heat to the heat-transfer medium or absorbs it from this; the fluids in the context of the present invention are, on the one hand, the flue gas (or flue gas/tertiary air mixture) and the air to be heated on the other hand.

In the context of the present invention, preferably a thermal oil (can also be synonymously referred to as thermal oil in the context of the present invention) is used as a heat-transfer medium for the transfer of heat between the burner part and the air heating part, via the flat-tube gas heat exchanger/exhaust-air heat-exchanger circuit.

Such thermal oils for oil cooling and for heating industrial plants and processes in closed circuits are basically known and these thermal oils can have different properties depending on their chemical composition. In the context of the present invention, mineral oils (for example diesel oils), synthetic oils (for example silicone oils), aromatic hydrocarbons (for example DP/DPO) can preferably be used as thermal oils. Particularly preferably Therminol SP is used as a heat-transfer fluid.

The flue gases (combustion exhaust gases) are extracted from the heating device, more precisely the combustion chamber, via the induced-draft blower. By this it is achieved that the components such as (pellet) storage container, combustion chamber, heat-exchanger area, tertiary air duct (ducts, especially in the double-walled, internally hollow combustion-chamber wall) have an internal pressure that is lower than the ambient pressure. This is particularly favourable when starting up the heating device, but also has a supporting effect during ongoing operation. In addition, it is ensured that the flue gases only flow out through the stack (i.e., guidable) and not through possible leaks. The induced-draft blower can, for example, consist of a speed-controlled blower motor that drives a fan propeller.

The blower arranged in the heating part can also have a speed-controlled motor that drives the fan propeller. The blower in the heating part can, however, also be a combined device of several fan propellers.

In preferred embodiments, the combustible material supply of the heating device via a screw conveyor has a relatively small cross-section with relatively large longitudinal expansion, so that a large part of the heat is radiated over the (steel) walls of the feeding device and the temperature from the combustion chamber in the direction of (pellet) storage container decreases very quickly.

In addition, a relatively small amount of combustible material is contained in the screw conveyor, which usually cannot develop sufficient heat for a return fire, as the heat losses predominate, and any possible embers cannot continue. Although accordingly with the screw conveying of the combustible material into the combustion chamber preferred according to the invention combustible material the risk of a return fire from the combustion chamber in the direction of (pellet) storage container is classified as low, for safety in variants of the present invention, a fuse, for example melting fuse, can still be arranged, whereby extinguishing water, $CO_2$, $N_2$, or another extinguishing agent can be triggered to extinguish such a return fire.

The better the connection between flat-tube flue-gas heat exchanger and exhaust-air heat exchanger is insulated and the shorter it is, the more effective the heat efficiency of heat transfer; in this respect, it is preferred in the context of the present invention if this connection is as short and as well insulated as possible.

Some aspects of the present invention worth mentioning are therefore among others the following:

The heating device of the present invention preferably uses combustible material based on biomass, in particular wood pellets, and preferably uses thermal oil for heat transfer from the burner part to the heating part as a heat-transfer medium.

The heating device of the present invention preferably also uses regulated tertiary air to increase efficiency (the amount of sucked in tertiary air is regulated by a continuously adjustable fan flap, depending on the temperature in the combustion chamber; when starting up the heating device, initially no tertiary air is sucked in), wherein the energy is obtained in two stages; as the first stage, a tertiary-air heat exchanger, in which the freshly sucked in tertiary air is heated by the flue gas (or flue gas/air mixture) and as a second stage, the radiant heat of the combustion chamber, when the tertiary air preheated in the tertiary-air heat exchanger flows through the double-walled, internally hollow combustion-chamber wall.

The heating device of the present invention comprises a flue-gas flap which (automatically) regulatedly causes a reliable overheating protection. The heating device of the present invention enables direct heat recovery by co-use of radiant-heat exchanger.

The heating device of the present invention comprises an automatic monitoring of the combustible material supply, in one variant preferably by means of a radar probe for the continuous measurement and monitoring of the supply of biomass-based combustible material (pellets).

The firing grate in the combustion chamber consists in preferred variants of high-temperature steel lamellae on a central shaft, where they are mounted in a twist-proof manner.

In this case, the firing grate lamellae are kept at a defined distance by means of spacer elements and thus allow on the one hand the supply of the primary air (under flow) to the combustible material, and on the other hand they thereby serve (supportively) the cleaning or ash discharge into the underlying ash container.

In some preferred variants, the cleaning is automatically initialized depending on the exhaust gas values, which are determined by a lambda probe. The cleaning process can, for example, be carried out in such a way that a rotational movement is carried out at a predetermined angle of the firing grate, which is pulled through a fixed comb at the end point of the movement. The comb itself preferably consists of fixed lamellae.

As a heat exchanger for heating the thermal oil serves in particular a flat-tube flue-gas heat exchanger (energy conversion in the primary circuit of the heating chamber) such heat exchangers are commercially available, for example, from Fercher GmbH.

A flue-gas flap as overheating protection, wherein the temperature of the heat-transfer medium and/or the system is monitored and when critical limit temperatures are reached, the flue-gas flap is automatically opened. The limit values for flue gases are at 550° C. and for thermal oil 280° C. in normal operation. In the event of an emergency stop or power failure, this is triggered at the flue gas temperature of 150° C.

Although the invention is primarily directed at the use of biomass products as combustible materials, it should be understood that the heating device according to the invention is also suitable for the combustion of other substances. For example, coal can also be burned (which in a broader sense could still fall under biomass) or also plastics, preferably in granular form. For the combustion of plastics, however, it may be necessary to install an exhaust gas filter or an exhaust gas filter system (pure polyethylene, for example, is also, however, combustible without a filter with appropriate control of the heating device according to the invention). In this respect, the use of the heating device according to the invention for the combustion of plastics is also included in the present invention.

Optionally, the heating device according to the invention is equipped with a device for generating electrical energy. Here, elements operating according to the Seebeck effect in a possible variant, preferably commercially available Peltier elements, are in good thermally conductive contact between the hot combustion gases on the one side and the heat exchanger that is still or again cool (er) on the other side. This creates a temperature gradient within the elements, which generates an electrical voltage and electrical energy can be taken off. In the best case, the electrical energy generated is sufficient to supply the (transmission) motor for the combustible material supply, the induced-draft blower and the control device or control electronics (if present) and via a standardized connector to feed external small consumers such as LED lamps or to charge accumulators of mobile devices. As a result, the heating device according to the invention is also suitable for use in remote areas where neither a public electrical power grid nor the connection to a vehicle or caravan battery is available.

The person skilled in the art can easily carry out the exact design of the combustion chamber such as, for example, size, wall thicknesses, materials, etc. for a certain combustible material or a certain energy turnover/calorific value within the scope of his general technical knowledge.

If in the description of the device according to the invention parts or the whole device are marked as "consisting" of, this is to be understood as referring to the said essential components. Self-evident or inherent parts such as pipes, valves, screws, measurement devices, etc. are not excluded by that. Preferably, however, other essential components, such as further combustion chambers, or the like would be, which would change the function (mode), are excluded.

The various embodiments of the present invention, for example—but not exclusively—those of the various dependent claims, can be combined with each other in any way, provided that such combinations do not contradict each other.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention. Thus, the drawings are not to be interpreted in a limiting manner and are not true to scale. The drawings are schematic and furthermore do not contain all features that usual devices have, but are reduced to the features essential for the present invention and its understanding, for example screws, connections etc. are not or not shown in detail.

Same reference numbers show same features in the figures, the description and the claims.

In the drawings.

DETAILED DESCRIPTION OF PREFERRED EMBODIMENTS

Figure 1:
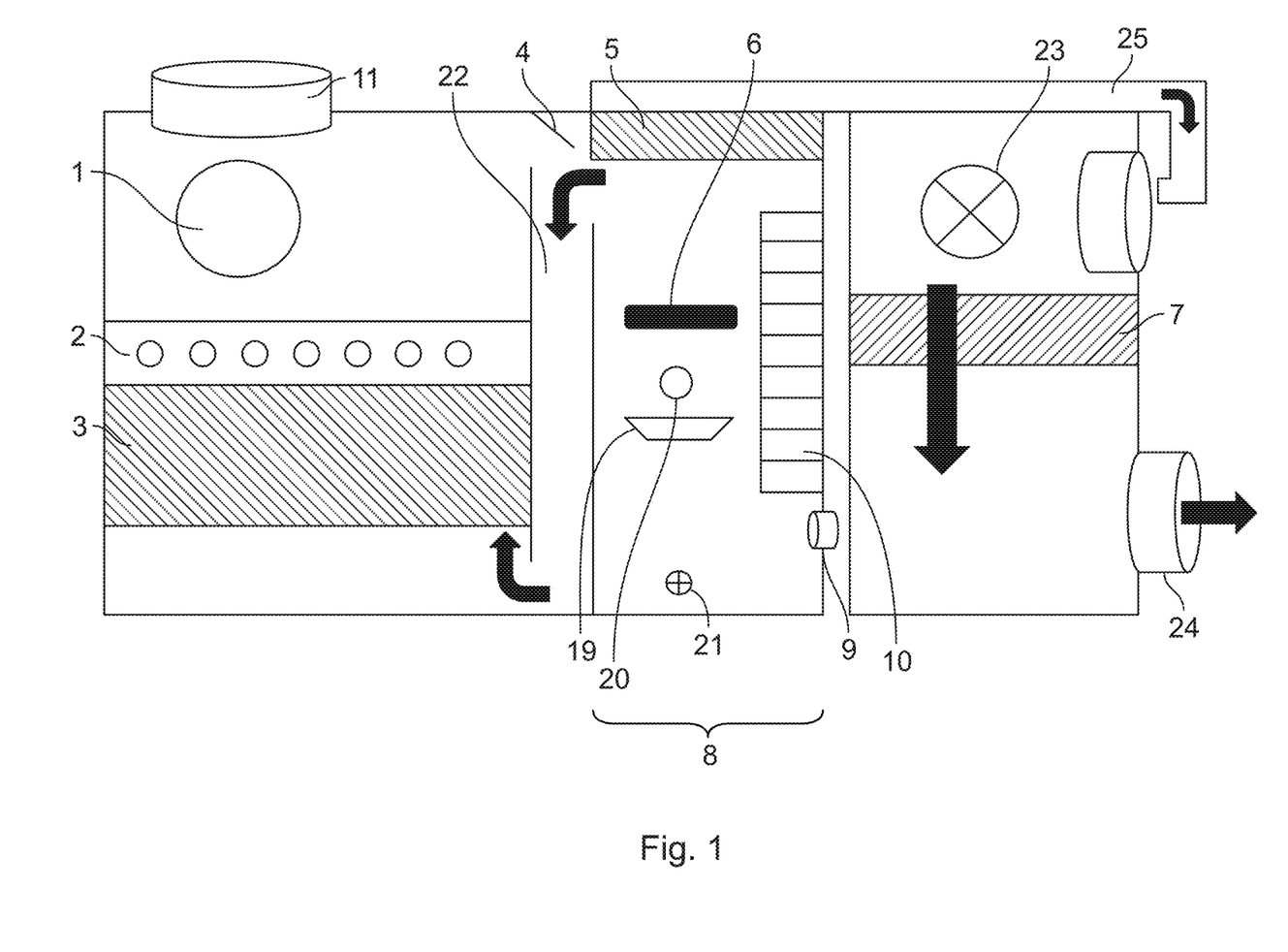
FIG. 1 shows an embodiment of a variant of a heating device according to the invention schematically from the front.

FIG. 1 shows an embodiment of a variant of a heating device according to the invention schematically from the front. The burner part is shown on the left and the heating part on the right. In the burner part, an opening or an inlet for primary air 9 is illustrated at the bottom right (shown here as a single opening, but it can also be a plurality of ducts, but can also be grid-shaped or otherwise designed; grid-shaped has proven itself in order not to allow any combustible material to escape). From there, air flows into combustion chamber 8. In the combustion chamber, the firing grate 19, the feed opening for the combustible material 20 and at the very bottom the screw conveyor for the combustible material-waste removal 21 are indicated (the combustible material collection chamber itself is not shown here, as it would be behind the screw conveyor 21 in this illustration). Above the firing grate 19 is the secondary air intake 6 (shown here as a filled rounded rectangle, can in reality, for example, be grid-shaped or otherwise designed; grid-shaped has proven itself in order not to allow any combustible material to escape). In the combustion chamber 8, the combustible material is combusted, and the flue gases rise. These contact the top of the boundary of combustion chamber 8, where they transfer heat to a radiant-heat exchanger 5 arranged on it and otherwise follow the path to the left into the flue-gas duct 22 (see filled arrow). The path through the flue-gas duct 22 then leads downwards, in counter-current along the (hot) wall to combustion chamber 8. Once at the bottom, the path leads to the left (see filled arrow) and upwards into the area of the heat exchangers. There, the flue gas flows first through a flat-tube flue-gas heat exchanger 3 and then through a tertiary-air heat exchanger 2. Above this the induced-draft blower 1, by which an underpressure in the burner part is generated, is arranged. Ultimately, the flue gas flows through stack 11 to the outside. Furthermore, the flue-gas flap 4 is shown, which at too high a temperature establishes a direct connection from the beginning of the flue-gas duct 4 to the beginning of the stack 11, in order to prevent overheating of the device or the heat-transfer medium in the flat-tube flue-gas heat exchanger (illustrated here in the open position). The tertiary air heat exchanger 2 is shown here as a series of circles representing pipes. These are flown around by hot flue gas and by these tertiary air is sucked in from the outside. This tertiary air then flows through pipes (not shown) to the double-walled, internally hollow combustion-chamber wall 10, which is illustrated here in the form of rectangles to indicate baffles that cause a meander-like flow guidance. In the double-walled, internally hollow combustion-chamber wall 10, the tertiary air flows upwards in a meander-like manner, whereby it is heated by the hot combustion-chamber wall and exits at the upper end through the opening of the double-walled, internally hollow combustion-chamber wall 10 and flows into the combustion chamber, preferably above the combustion zone and afterburn zone. Then it flows with the flue gas in the described way through the burner part.

The heating part shown on the right in the figure comprises an air-intake blower 23, which sucks in air to be heated from the outside. The heating part also comprises with the air intake part 25 at its upper end a connection to the radiant-heat exchanger 5 (whereby the air heated there is sucked in either from above the radiant-heat exchanger 5 or through the radiant-heat exchanger 5—see filled arrow). Thus, part of the air sucked in is already heatedly (by the radiant-heat exchanger 5) sucked in and a part is sucked in directly from the environment. The partially already somewhat heated air to be heated then flows down here and over the exhaust-air heat exchanger 7 (see filled arrow), whereby the air is heated. The exhaust-air heat exchanger 7 is flowed through by hot thermal oil, which was heated in the burner part in the flat-tube flue-gas heat exchanger 3 by the hot flue gas. The heated air then exits the device through the outlet opening for the heated air 24 (see filled arrow) and can be used for heating.

Figure 2:
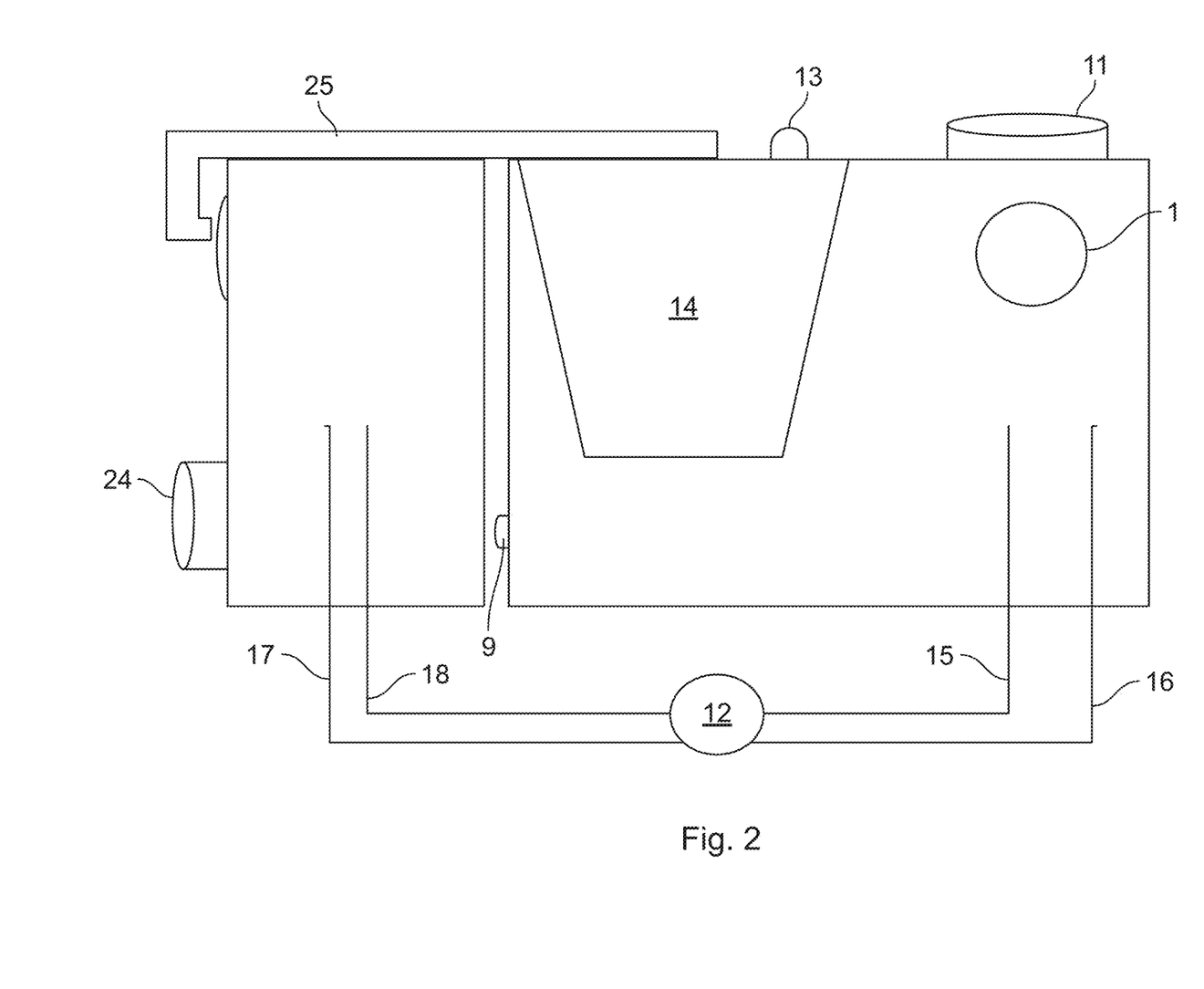
FIG. 2 shows the embodiment according to FIG. 1 from behind, so now the burner part is on the right and the heating part on the left.

FIG. 2 shows the embodiment according to FIG. 1 from behind, so now the burner part is on the right and the heating part on the left. Approximately in the middle of the figure is the (pellet) storage container 14, from which the combustible material is conveyed into the combustion chamber. At the upper end of the (pellet) storage container 14, a radar probe 13 is illustrated, with which the filling level of the (pellet) storage container 14 is monitored. In addition, the induced-draft blower 1 is shown as a circle on the right, since the corresponding drive motor of the blower is usually installed (as shown here) on the back wall of the burner part. Below the induced-draft blower 1 are the heat exchangers, which are not further shown here. On the other hand, the feed flow to the flat-tube flue-gas heat exchanger 15 and the return flow from the flat-tube flue-gas heat exchanger 16, in conjunction with pump 12, are shown. The pump 12 is shown below the housing, here, but this is only for easier illustration, usually it is located directly on or a small piece behind the rear housing wall. Accordingly, the feed flow to the exhaust-air heat exchanger 17 and the return flow from the exhaust-air heat exchanger 18 are also connected to the pump, since the two heat exchangers form a circuit that is flowed through by heat-transfer medium, preferably thermal oil. These two pipelines end on the left side of the heating part at the point where the exhaust-air heat exchanger 7 is located.

EXAMPLE

The invention is now further explained with reference to the following, non-limiting example.

A heating device, as shown in the figures, was fed with commercially available wood pellets as combustible material and the combustion started. After reaching the stationary state, a stable temperature between 220° C. and 250° C. was obtained on the flat-tube flue-gas heat exchanger.

During combustion, the air-intake blower ran in the heating part with a power of about 6000 $m^3$, thus achieving an air volume flow of 10,000 $m^3$, which could be heated to 82° C. at an outside temperature of 0° C.

An output of 200 KW was achieved constantly (except when starting up and shutting down).

One can see from the data that the heating device according to the invention is very effective and achieves a high efficiency.

Although only a few embodiments of the present invention have been shown and described, it is to be understood that many changes and modifications may be made thereunto without departing from the spirit and scope of the invention.

REFERENCE LIST 1 induced-draft blower
2 tertiary-air heat exchanger
3 flat-tube flue-gas heat exchanger
4 flue-gas flap
5 radiant-heat exchanger
6 secondary-air duct or inlet
7 exhaust-air heat exchanger
8 combustion chamber
9 primary-air duct or inlet
10 double-walled, internally hollow combustion-chamber wall (with internal baffles for a meander-like flow guidance)
11 stack
12 pump
13 (radar) probe
14 (pellet) storage container
15 feed flow to the flat-tube flue-gas heat exchanger
16 return flow from the flat-tube flue-gas heat exchanger 17 feed flow to the exhaust-air heat exchanger
18 return flow from the exhaust-air heat exchanger
19 firing grate
20 feed opening for the combustible material
21 screw conveyor for the combustible material-waste removal
22 flue-gas duct
23 air-intake blower
24 outlet opening for the heated air
25 air-intake part that sucks in air from above the radiant-heat exchanger or through the radiant-heat exchanger

What is claimed is:

1. A heating device, comprising
A) a burner part, comprising
a combustion chamber,
a double-walled, internally hollow combustion-chamber wall, which has an upper opening leading above the combustion zone into the combustion chamber,
a flue-gas duct which leads the flue gas downwards along the outside of the combustion chamber,
the flue-gas duct is followed by a heat-exchanger area comprising
initially, a flat-tube flue-gas heat exchanger,
then, a tertiary-air heat exchanger,
a flue-gas ventilation stack,
a radiant-heat exchanger located above the combustion chamber,
a flue-gas flap at the upper end of the flue-gas duct, which, when open, connects the flue-gas duct to the stack,
B) a heating part, comprising
an air suction blower,
an exhaust-air heat exchanger with the same heat-transfer medium as the flat-tube flue-gas heat exchanger,
an outlet opening for the heated air,
wherein the flat-tube flue-gas heat exchanger forms a heat-exchanger circuit with the exhaust-air heat exchanger.

2. The heating device according to claim 1, wherein the combustion chamber comprises
inlet ducts or inlet openings for primary air and secondary air,
a firing grate,
a feed opening for combustible material,
a combustible material-waste collection chamber and/or a combustible material-waste discharge device for removal of combustible material waste.

3. The heating device according to claim 1, further comprising a storage container or a pellet storage container, which is connected to the combustion chamber via the feed opening for combustible material.

4. The heating device according to claim 1, wherein the upper opening of the double-walled, internally hollow combustion-chamber wall leads into the combustion chamber, and wherein the double-walled, internally hollow combustion-chamber wall comprises a lower opening or a connection, configured to get tertiary air introduced.

5. The heating device according to claim 1, wherein the flue-gas duct is arranged in relation to the double-walled, internally hollow combustion-chamber wall on the other side of the combustion chamber, and leads the flue gas along its wall downwards to the combustion chamber.

6. The heating device according to claim 1, wherein the heat-exchanger area is arranged from the viewing direction of the combustion chamber beyond the flue-gas duct and the flat-tube flue-gas heat exchanger is operated with thermal oil as a heat-transfer medium and the tertiary-air heat exchanger comprises inlet ducts or inlet openings for tertiary air and comprises discharges for the heated tertiary air, which are connected to the double-walled, internally hollow combustion-chamber wall.

7. The heating device according to claim 1, wherein subsequently to the heat-exchanger area an area with induced-draft blower adjoins, or wherein an induced-draft blower is arranged in or at the flue-gas exhaust stack.

8. The heating device according to claim 1, wherein the heating part comprises an air-intake part which sucks in air from above the radiant-heat exchanger or through the radiant-heat exchanger.

9. The heating device according to claim 1, wherein the air-intake blower of the heating part sucks in air from the air-intake part at least partially, and otherwise sucks in air from the environment.

10. The heating device according to claim 1, wherein the two parts A) and B) are connected by the piping of the flat-tube flue-gas heat exchanger to the exhaust-air heat exchanger, and, where applicable, by the connection of the air intake of the heating part to the radiant-heat exchanger, and are otherwise physically separated units.

11. The heating device according to claim 1, wherein the combustion chamber comprises a burner.

12. The heating device according to claim 1,
wherein the combustion chamber, comprises
inlet ducts or inlet openings for primary air and secondary air,
a firing grate and a burner
a feed opening for combustible material,
a combustible material-waste collection chamber and/or a combustible material-waste discharge device for removal of combustible material waste,
wherein the burner part further comprises a storage container or a pellet storage container, which is connected to the combustion chamber via the feed opening for combustible material,
wherein the double-walled, internally hollow combustion-chamber wall, further comprises a lower opening or connection configured to get tertiary air introduced,
wherein the flue-gas duct is arranged on the other side of the combustion chamber in relation to the double-walled, internally hollow combustion-chamber wall and leading the flue gas downwards from above along its wall adjacent to the combustion chamber,
wherein adjacent to the flue-gas duct, arranged in the flow direction of the flue gas beyond the flue-gas duct, is located the heat-exchanger area
wherein the tertiary air heat exchanger comprises inlet ducts or inlet openings for tertiary air and discharges for the heated tertiary air connected to the double-walled, internally hollow combustion-chamber wall,
wherein the heating part further comprises
an air-intake part which sucks in air from above the radiant-heat exchanger or through the radiant-heat exchanger,
wherein the air suction blower comprises an air-intake blower which at least partially sucks air from the air-intake part, and otherwise sucks in air from the environment,
wherein the two parts A) and B) are connected by the piping of the flat-tube flue-gas heat exchanger to the exhaust-air heat exchanger.

13. The heating device according to claim 12, wherein the burner part comprises, adjoining the heat-exchanger area, an area with an induced-draft blower.

14. A burner part, comprising
a combustion chamber, comprising
inlet ducts or inlet openings for primary air and secondary air,
a firing grate and a burner
a feed opening for combustible material,
a combustible material-waste collection chamber and/or a combustible material-waste discharge device
a storage container or a pellet storage container, which is connected to the combustion chamber via the feed opening for combustible material,
a double-walled, internally hollow combustion-chamber wall, which has an upper opening which is located above the combustion zone leading into the combustion chamber, and a lower opening, configured to get tertiary air introduced,
a flue-gas duct arranged on the other side of the combustion chamber in relation to the double-walled, internally hollow combustion-chamber wall and leading the flue gas downwards from above along its wall adjacent to the combustion chamber,
adjacent to the flue-gas duct, arranged in the flow direction of the flue gas beyond the flue-gas duct, a heat-exchanger area comprising,
initially, a flat-tube flue-gas heat exchanger,
then, a tertiary-air heat exchanger comprising inlet ducts or inlet openings for tertiary air and discharges for the heated tertiary air connected to the double-walled, internally hollow combustion-chamber wall,
a flue-gas ventilation stack,
a radiant-heat exchanger located above the combustion chamber,
a flue-gas flap at the upper end of the flue-gas duct, which, when open, connects the flue-gas duct to the stack.

15. The burner part according to claim 14, further comprising, adjoining the heat-exchanger area, an area with an induced-draft blower.

16. A method for increasing the efficiency of a heating device by
firing a combustion in a combustion chamber under supply of primary air through the combustion zone and supply of secondary air at the upper end of the combustion zone, conducting the flue gas via first a flat-tube flue-gas heat exchanger and then via a tertiary-air heat exchanger,
conducting the tertiary air thus heated into a double-walled, internally hollow combustion-chamber wall for further heating,
leading the heated tertiary air from the double-walled, internally hollow combustion-chamber wall into the combustion chamber above the combustion zone, and mixing with the flue gas,
transferring heat to at least a part of the air to be heated by a heat exchanger located above the combustion chamber,
transferring further heat to the air to be heated by an exhaust-air heat exchanger by a heat-transfer medium heated in the flat-tube flue-gas heat exchanger.

17. A heating device, comprising
A) a burner part, comprising
a combustion chamber, comprising
inlet ducts or inlet openings for primary air and secondary air,
a firing grate and a burner
a feed opening for combustible material,
a combustible material-waste collection chamber and/or a combustible material-waste discharge device,
a storage container or a pellet storage container, which is connected to the combustion chamber via the feed opening for combustible material,
a double-walled, internally hollow combustion-chamber wall, which comprises an upper opening which above the combustion zone leads into the combustion chamber, and comprises a lower opening or connection configured to get tertiary air introduced,
a flue-gas duct arranged on the other side of the combustion chamber in relation to the double-walled, internally hollow combustion-chamber wall and leading the flue gas downwards from above along its wall adjacent to the combustion chamber,
adjacent to the flue-gas duct, arranged in the flow direction of the flue gas beyond the flue-gas duct, a heat-exchanger area comprising,
initially, a flat-tube flue-gas heat exchanger,
then, a tertiary air heat exchanger comprising inlet ducts or inlet openings for tertiary air and discharges for the heated tertiary air connected to the double-walled, internally hollow combustion-chamber wall,
a flue-gas ventilation stack,
a radiant-heat exchanger located above the combustion chamber,
a flue-gas flap at the upper end of the flue-gas duct, which, when open, connects the flue-gas duct to the stack,
B) a heating part, comprising
an air-intake part which sucks in air from above the radiant-heat exchanger or through the radiant-heat exchanger,
an air-intake blower which at least partially sucks air from the air-intake part, and otherwise sucks in air from the environment,
an exhaust-air heat exchanger with the same heat-transfer medium as the flat-tube flue-gas heat exchanger,
an outlet opening for the heated air,
wherein the flat-tube flue-gas heat exchanger forms a heat-exchanger circuit with the exhaust-air heat exchanger, and the two parts A) and B) are connected by the piping of the flat-tube flue-gas heat exchanger to the exhaust-air heat exchanger, and, where applicable, via the connection of the air-intake part of the heating part to the radiant-heat exchanger.

18. The heating device according to claim 17, wherein the burner part comprises, adjoining the heat-exchanger area, an area with an induced-draft blower.

* * * * *